(12) United States Patent
Boden et al.

(10) Patent No.: US 7,270,529 B2
(45) Date of Patent: Sep. 18, 2007

(54) APPARATUS FOR BLOW MOLDING

(75) Inventors: Christian S. Boden, LaSalle, MI (US);
A. Dale Maddox, Tecumseh, MI (US);
Robert L. Padley, Brooklyn, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 226 days.

(21) Appl. No.: 11/054,283

(22) Filed: Feb. 8, 2005

(65) Prior Publication Data
US 2006/0177533 A1    Aug. 10, 2006

(51) Int. Cl.
*B29C 49/50*    (2006.01)
*B29C 49/60*    (2006.01)
*B29C 49/64*    (2006.01)

(52) U.S. Cl. ............ 425/182; 425/195; 425/525; 425/526; 425/527; 425/536

(58) Field of Classification Search ............ 425/182, 425/195, 525, 526, 527, 536; 264/527
See application file for complete search history.

(56) References Cited

U.S. PATENT DOCUMENTS

| | | | | |
|---|---|---|---|---|
| 3,089,185 A | * | 5/1963 | Di Settembrini | 264/526 |
| 3,294,885 A | * | 12/1966 | Cines et al. | 264/527 |
| 3,380,121 A | * | 4/1968 | Chittenden et al. | 425/528 |
| 5,585,121 A | | 12/1996 | Morris | |
| 5,776,518 A | | 7/1998 | Wohlgemuth | |
| 5,840,350 A | | 11/1998 | Salemi | |
| 5,894,024 A | | 4/1999 | Lambarth et al. | |

FOREIGN PATENT DOCUMENTS

JP     08034022 A  *  2/1996

OTHER PUBLICATIONS

Rosato et al, Blow Molding Handbook, 1989, Oxford University Press, pp. 273-279 and 299-303.*

* cited by examiner

*Primary Examiner*—Robert B. Davis
(74) *Attorney, Agent, or Firm*—John W. Gregg

(57) ABSTRACT

A mold assembly for blow molding comprises first and second mating mold components, each mating mold component comprising molding surfaces open to a mating face of the mold component and defining the exterior of an article to be molded from a tubular parison and at least one replaceable element being attached thereto by retaining means accessible from the mating face thereof whereby the replaceable elements may be installed and removed while the mating mold component is mounted in a press of a blow molding machine. The replaceable elements comprise any of inserts comprising molding surfaces defining a neck portion of an article to be molded, a blow needle to pierce the wall of and pressurize the parison and heat pipes for transferring heat from the molding surfaces. A blow molding machine comprises a press mechanism for operating a mold assembly and a mold assembly according to the invention mounted thereto.

12 Claims, 3 Drawing Sheets

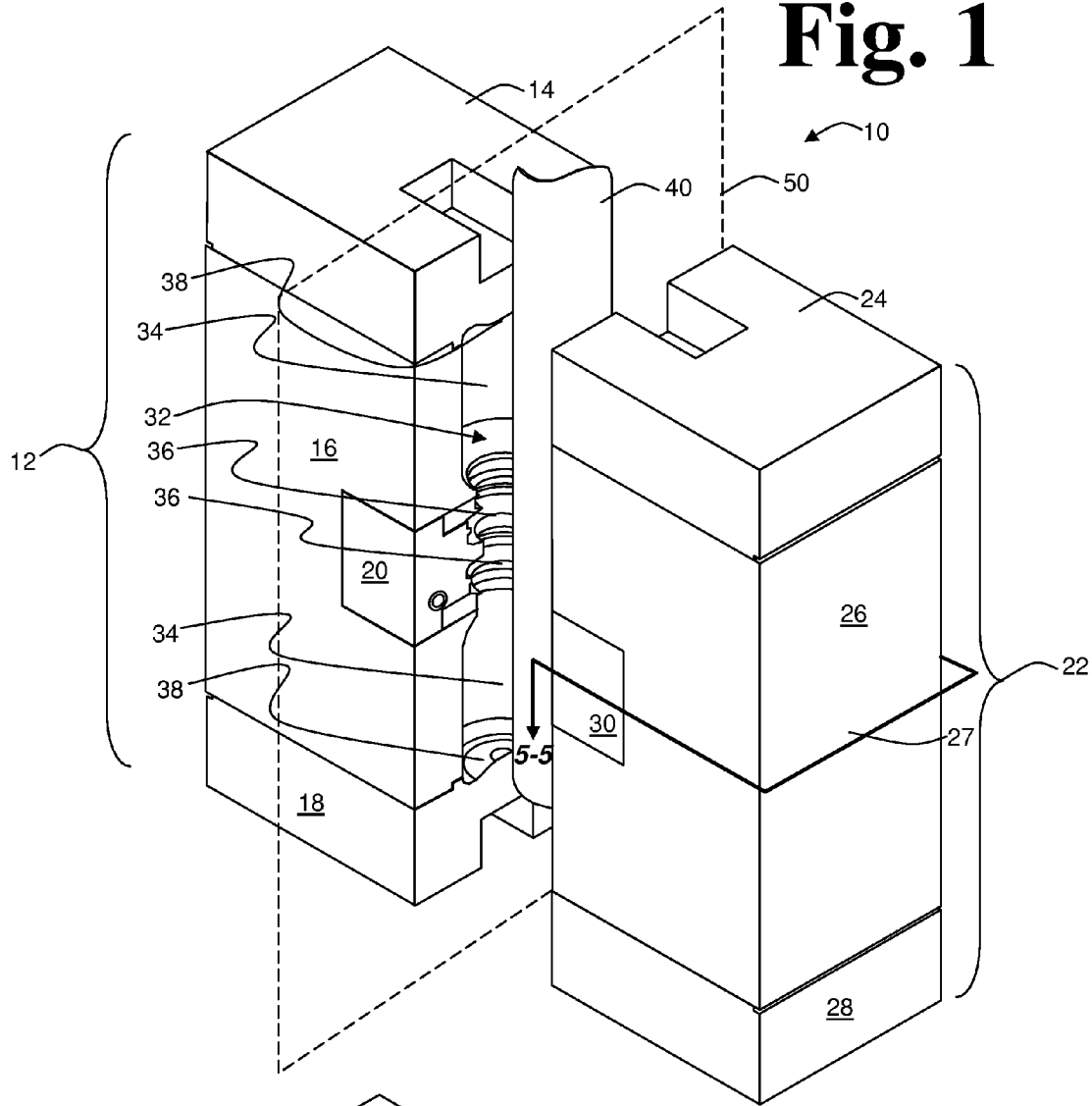
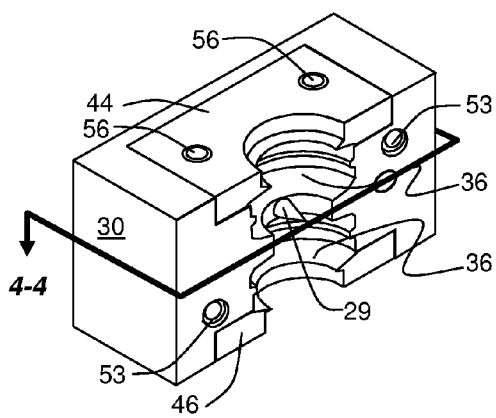

APPARATUS FOR BLOW MOLDING

I. BACKGROUND OF THE INVENTION

1. Field of the Invention

This invention relates generally to blow molding. In particular, this invention relates to mold assemblies for blow molding.

2. Description of Related Art

Blow molding is a cyclic process wherein a parison of material in a moldable condition is centered on the parting plane of a mold assembly, the mold assembly is closed around the parison, the parison is expanded so the exterior of the parison abuts molding surfaces defined by the closed mold assembly, the blow molded article is conditioned to be sufficiently rigid to retain its size and shape while unsupported, the mold assembly is opened and the blow molded article is removed. In general, the moldable condition of the parison is achieved when the material of the parison is at an elevated temperature, and the rigid condition of the blow molded article is achieved when the temperature of the material has been reduced. A blow molding machine comprises a press for opening and closing the mold assembly, blowing means for introducing a pressurized fluid (typically air) to expand the parison in the mold assembly, means for handling the molded article upon removal from the mold assembly and means for trimming waste from the molded article. Additionally, a blow molding machine may comprise heat transfer devices to elevate the temperature of the parison to achieve the moldable condition and to reduce the temperature of the blow molded article to achieve the rigid condition.

Blow molding is commonly used for production of containers wherein the blow molded article comprises a body portion defining a closed end and a neck portion connecting the body and a mouth opening, the mouth opening being an opening through which the blowing fluid is admitted to the container. Mold assemblies for blow molding containers comprise mating mold components wherein molding surfaces open to the mating faces of the mold components define the exterior of the container. Advantageously, the neck portion of the container comprises an exterior surface having a feature, such as a thread, called the "neck finish" for engaging a separable closure and the mating mold components comprise inserts for forming such features. In addition, the neck portion further comprises a dome element for handling the blow molded article, the dome element comprising waste of the blow molded article which is eliminated from the finished container. Advantageously, the dome element comprises an external groove to be engaged by handling means of a blow molding machine after removal of the molded article from the mold assembly. Inserts for forming the neck portion define the exterior surface of both the neck finish and the dome element. In known mold assemblies, the inserts are attached to the mating mold components by fasteners that are accessible only with removal of the mold assembly from the molding machine. Replacement of inserts of known mold assemblies to produce containers having a different neck finish or to refurbish inserts that are degraded through use requires time consuming disassembly of machine elements. Hence, a need exists to permit the replacement of inserts without such disassembly.

II. SUMMARY OF THE INVENTION

It is an object of the present invention to provide a mold assembly for blow molding comprising mating mold components having molding surfaces open to mating faces thereof and replaceable elements attached to the mating mold components by retaining means accessible from the mating faces thereof whereby the replaceable elements may be installed and removed from a mating mold component while the mating mold component is mounted in a press of a blow molding machine.

It is a further object of the present invention to provide a blow molding machine comprising a press mechanism for operating a mold assembly mounted thereto, the mold assembly comprising mating mold components having molding surfaces open to mating faces thereof and replaceable elements attached to the mating mold components by retaining means accessible from the mating faces thereof whereby the replaceable elements may be installed and removed from a mating mold component while the mating mold component is mounted in the blow molding machine press mechanism.

Further objects and advantages of the invention shall be made apparent from the accompanying drawings and the following description thereof.

In accordance with the aforesaid objects the present invention provides a mold assembly for blow molding comprising first and second mating mold components, each mating mold component comprising molding surfaces open to a mating face of the mold component and defining the exterior of an article to be molded from a tubular parison and at least one replaceable element being attached to the mating mold component by retaining means accessible from the mating face of the mating mold component whereby replaceable elements may be installed and removed from the mating mold component while the mating mold component is mounted in a press of a blow molding machine. A blow molding machine comprises a press mechanism for operating a mold assembly and a mold assembly according to the invention mounted thereto.

III. BRIEF DESCRIPTION OF THE DRAWINGS

FIG. 1 is a three dimensional view of components of a mold assembly according to the invention with a parison therebetween.

FIG. 3 is a three dimensional view of an insert for a mold component of FIG. 1.

IV. DETAILED DESCRIPTION OF THE PREFERRED EMBODIMENT

Figure 2A:
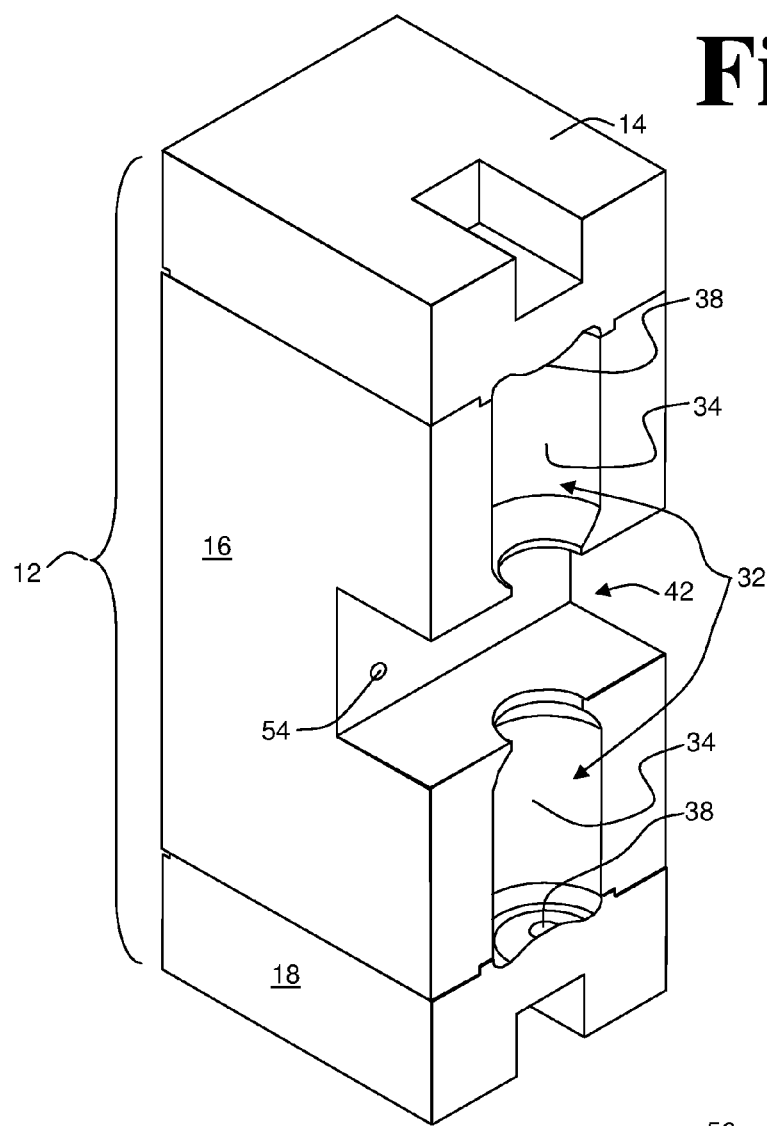
FIGS. 2a and 2b are three dimensional views of a mold component and insert therefore of FIG. 1.

The invention shall be illustrated with reference to a preferred embodiment which shall be described in detail. It is not the intention of applicant that the invention be limited to the preferred embodiment, but rather that the invention shall be defined by the appended claims and all equivalents thereof.

Referring to FIG. 1, mold assembly 10 comprises mating mold components 12 and 22 each referred to herein as a "mold half". Each of mold components 12 and 22 is carried by a member of a molding machine press (not shown) for translating the mold components between open and closed positions relative to each other (the open position depicted in FIG. 1). In the open position, mold components 12 and 22 are separated permitting admission of a parison such as parison 40 therebetween and removal of a molded article upon completion of a molding operation. In the closed position, mold components 12 and 22 abut at parting plane 50, the abutting faces of mold components 12 and 22 having molding surfaces thereon defining a cavity. The cavity shown in FIG. 1 is a double cavity, i.e., a cavity for simultaneously blow molding two articles, and is symmetrical about an imaginary plane transverse to the mold halves at the horizontal centerline of the cavity. Parison 40 is tubular, typically produced by extrusion of flowable material through a die (not shown) above mold assembly 10. Parison 40 is formed as a single continuous tubular extrusion with a length extending below the lowest molding surface of the cavity. With the molds closed surrounding the parison, the parison is pinched closed at ends of the cavity and pressurized to expand the parison material to abut the molding surfaces of the cavity.

Continuing with reference to FIG. 1, the portion 32 of the cavity defined by mold component 12 comprises molding surfaces 34, 36 and 38. Molding surfaces 34 define the bodies of the containers; molding surfaces 36 define the neck portions of the containers and, molding surfaces 38 define the base portions of the containers. Mold component 12 comprises center section 16 comprising molding surfaces 34; end sections 14 and 18 comprising molding surfaces 38 and, insert 20 comprising molding surfaces 36. The corresponding sections of mold component 22 are center section 26, end sections 24 and 28 and insert 30. Each of sections 22-30 comprise molding surfaces substantially mirroring molding surfaces 34, 36 and 38, respectively.

Figure 2B:
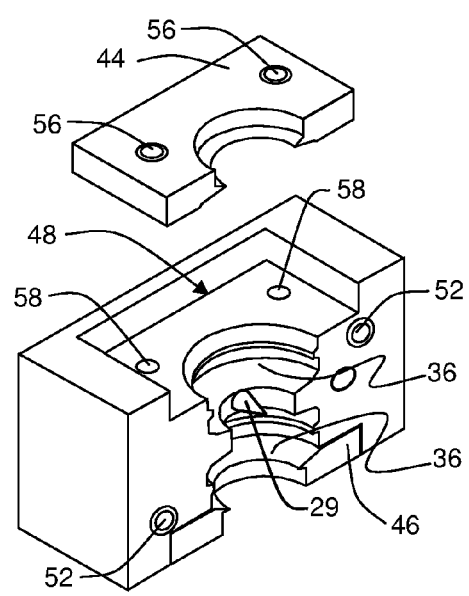

As is customary, molding surfaces defining the neck portion of containers to be molded comprise inserts comprising replaceable elements of the mating mold components. Referring to FIGS. 2a and 2b, mold component 12 is shown with insert 20 removed. Mold component 12 comprises recess 42 for receiving insert 20. Insert 20 is attached to mold component 12 by retaining means accessible from the mating face of mold component 12, for example fasteners such as bolts 52 engaging threaded bores 54 in center section 16. Bolts 52 are accessible from the parting plane face of insert 20, facilitating replacement of insert 20 without removal of mold component 12 from the molding machine press. A corresponding recess is provided in mold component 22 for insert 30 which is similarly attached to mold component 22. In FIG. 3, Bores 53 for attaching bolts 52 are shown in the front face of insert 30. Referring to FIGS. 2a and 3, inserts 20 and 30 comprise molding surfaces 36 defining the dome and neck finish of each of the two containers defined by the molding surfaces of mold components 12 and 22. A parting groove is formed in the periphery of the molded article between the neck finish and dome of each container by relatively sharp edged knife inserts 44 and 46. In FIG. 2b, knife insert 44 is shown displaced from insert 20 to reveal recess 48 therein. When seated in recess 48, knife insert 44 is attached to insert 20 by fasteners, such as for example, bolts 56 engaging threaded bores 58 in the base of recess 48. As molded, two containers are joined by an extension between the dome of each container, the domes and extension comprising waste of the molded article. Processing of the molded article after blow molding separates the two containers by parting the dome from the container at the parting grooves created by the knife inserts 44 and 46. In addition to forming the parting grooves, each of knife inserts 44 and 46 comprise molding surfaces for the neck finish of a container. The form of the neck finish and the height thereof are determined by the molding surfaces in each knife insert and the location relative thereto of the parting groove forming edge. Variations of these features are adopted for particular closures that may be applied to the container. Hence, as is customary, knife inserts are provided to facilitate substitution of mold elements defining these features. The ease of access to inserts 20 and 30 in accordance with the invention reduces the effort required to substitute knife inserts.

Figure 4:
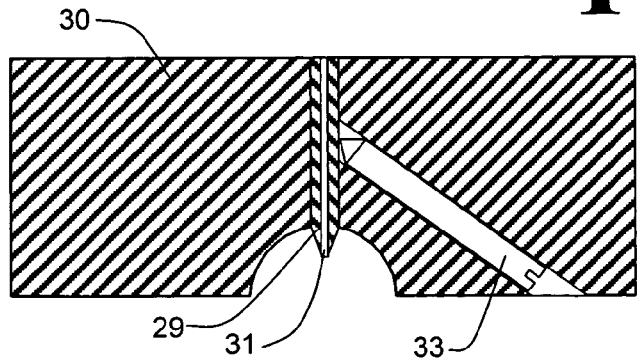
FIG. 4 is a partial sectional view taken along line 4-4 of FIG. 3.

Mold assemblies in accordance with the invention provide means for pressurizing parison 40 comprising means for piercing the wall thereof with mold closure, such means comprising replaceable elements of the mold components. With mold components 12 and 22 in the closed position surrounding a parison, pressurizing fluid is admitted through a blow needle entering the parison at one of inserts 20 and 30. Connections for supply of the pressurizing fluid, such as connection 27 in center section 26, are provided in the one of mold components 12 and 22 comprising the blow needle. Referring to FIGS. 3 and 4, blow needle 29 and its mounting in insert 30 is shown. The protrusion of blow needle 29 is seen at the molding surface extension between the domes of the neck portion of each container. Referring to FIG. 4, the cylindrical body of blow needle 29 is shown within a bore open to the molding surface face of insert 30. As shown, the protruding portion of blow needle 27 is advantageously of conical shape, the central passage 31 terminating at the tip of the cone. Blow needle 29 is fixed in its bore in insert 30 by retaining means such as a set screw 33 threadably engaged with insert 30 and intersecting the cylindrical body of blow needle 29 at an oblique angle (FIG. 4). On closure of mold assembly 10 to pinch closed a parison such as parison 40, blow needle 29 penetrates the parison wall permitting introduction of the pressurizing fluid to the interior of the closed parison. Pressurizing fluid admitted to central section 26 at connection 27 is conducted through central section 26 to central passage 31 of blow needle 29. Penetration of parison walls results in abrasion of the protruding the tip of blow needle 29 by the parison material, tending to blunt the tip necessitating replacement of the blow needle. Access to the retaining means for blow needle 29 from the molding surface face of insert 30 facilitates replacement of blow needle 29 without removal of insert 30 from central section 26. Although illustrated as applied to a mold assembly comprising a double cavity, the arrangement of the blow needle and retaining means shown and described is advantageously applied to mold assemblies having single cavities for forming articles lacking an open mouth through which pressurizing fluid would customarily be admitted. In such mold assemblies, a blow needle and retaining means in accordance herewith would be applied to the molding surface face of a mold component section or insert thereof chosen in accordance with overall design of the mold assembly.

Figure 5:
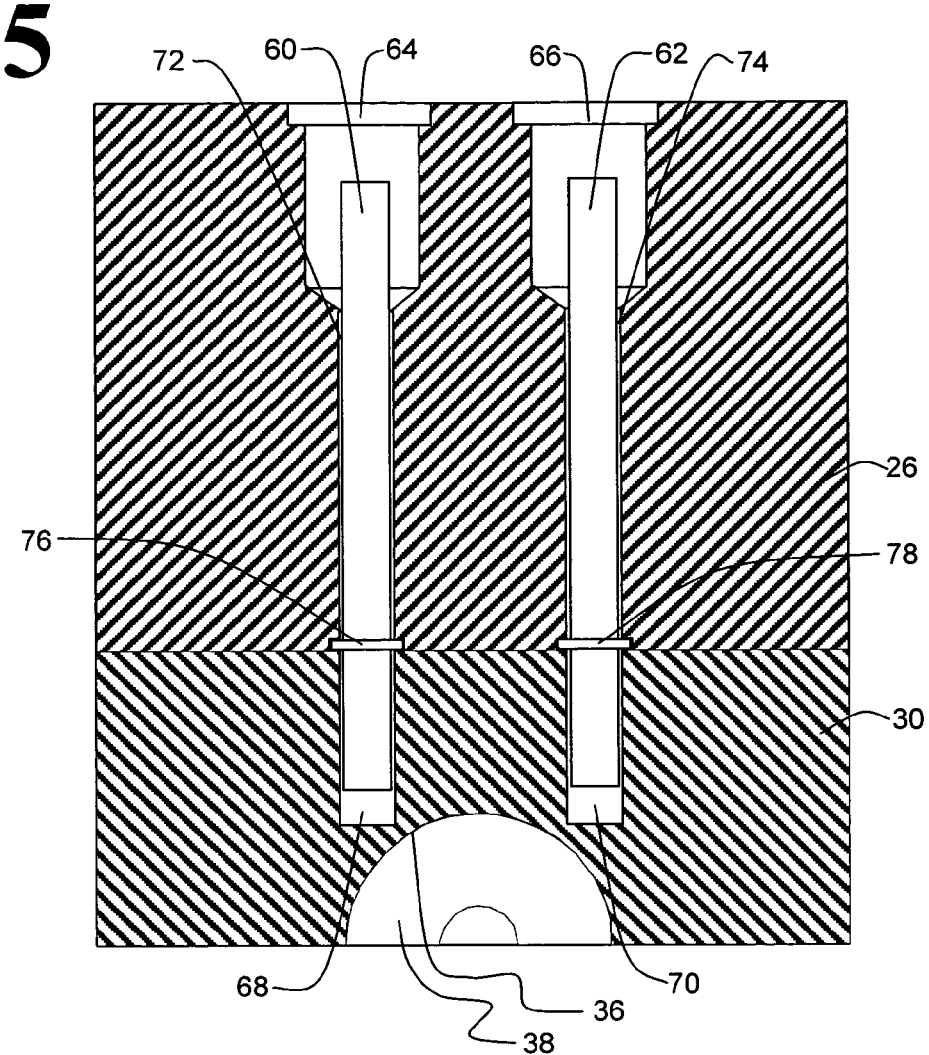
FIG. 5 is a partial sectional view of an insert and mold component taken along line 5-5 of FIG. 1.

In accordance with the invention, heat pipes are provided within the mating mold components to improve overall efficiency of heat transfer from molding surfaces. Each heat pipe comprises a sealed cylinder containing a wicking material and a working fluid. With opposite ends of the heat pipe proximate thermal masses at different temperatures, the working fluid is evaporated from heat transferred to the heat pipe proximate one end and the resulting vapor is condensed with transfer of heat from the heat pipe at the opposite end. The working fluid is transported through the wicking material to the end of the pipe where heat is being transferred to the heat pipe and the vapor is transported through the pipe to the end where heat is transferred from the heat pipe. As the ends of heat pipes exposed to heat transfer fluid are susceptible of corrosion and/or build-up of deposits from the heat transfer fluid, it may be necessary to replace the heat pipes periodically to maintain the desired improvements of heat transfer effectiveness. Heat pipes associated with inserts which are themselves replaceable elements comprise replaceable elements of mold assembly 10. Referring to FIG. 5, a partial cross section of center section 26 and insert 30 shows the locations of internal heat pipes for transfer of heat from insert 30 proximate the molding surface to a heat transfer fluid conducted through passages in center section 26. While two heat pipes are shown, the choices of the number and location of heat pipes are made with consideration given to the molding surfaces of the insert and the arrangement of heat transfer fluid conducting passages in center section 26. Heat pipes 60 and 62 are received within bores 68 and 70, respectively, of insert 30. The ends of heat pipes 60 and 62 within insert 30 being proximate the portion of molding surface 36 comprising the groove of the dome portion of the neck. With the double cavity configuration of FIG. 1, an additional pair of heat pipes (not shown) are located so that the ends thereof are proximate the groove of the dome portion of the neck associated with the second container cavity. Heat pipes 60 and 62 are supported in bores 72 and 74, respectively, in center section 26 and terminate in heat transfer fluid conducting passages within center section 26. Replacement of heat pipes 60 and 62 is effected by removal of insert 30 from center section 26 and extraction of the heat pipes from bores 72 and 74.

As shown in FIG. 5, bores 64 and 66 comprise heat transfer fluid conducting passages within center section 26 and advantageously comprise fittings for connection of heat transfer fluid conduits to mold assembly 10. In operation, heat is transferred from insert 30 to heat pipes 60 and 62 and from the heat pipes to heat transfer fluid being conducted through passages within center section 26. A seal is fitted at the intersection of each of bores 72 and 74 with the wall of the insert receiving recess of center section 26, such as seals 76 and 78 each seal surrounding the heat pipe and effective to prevent heat transfer fluid from passing out of center section 26 around the heat pipe. An advantage of use of heat pipes for heat transfer from insert 30 is the elimination of connections for conduction of heat transfer fluid to the interior of insert 30. An arrangement of heat pipes shown and described with reference to FIG. 5 is advantageously included in center section 16 and insert 20. Although illustrated as applied to a mold assembly comprising a double cavity, the use of heat pipes is advantageously applied to mold assemblies having single cavities. In such mold assemblies, each insert comprising molding surfaces for the neck portion of a container will comprise the section of a mold component having molding surfaces defining the body portion of each container moldable by the mold assembly. Heat pipes in accordance with the invention would be arranged in that mold component section and the insert to effect transfer of heat from the insert to a heat transfer fluid conducted through that mold component section.

What is claimed is:

1. A mold assembly for blow molding comprising first and second mating mold components, each mating component comprising molding surfaces open to a mating face of the mold component and defining the exterior of an article to be molded from a tubular parison, at least one replaceable insert comprising a portion of such molding surfaces being attached to the mating mold component by retaining means accessible from the mating face of the mating mold component, and at least one replaceable element comprising one of means for piercing a wall of the parison with mold closure, a heat pipe and a knife insert for forming a parting groove, each replaceable element being retained by retaining means accessible from the mating face of the mating mold component so that the replaceable element may be installed in and removed from the mating mold component while the mating mold component is mounted in a press of a blow molding machine.

2. The mold assembly according to claim 1 wherein the means for piercing the wall of the parison with mold closure, the piercing means comprises means for pressurizing the parison.

3. The mold assembly according to claim 1 wherein the at least one replaceable elements comprise at least one heat pipe located with one end thereof proximate a molding surface of the insert and the other end thereof in the interior of a passage within the mating mold component for conducting a heat transfer fluid and wherein the heat pipes may be removed from or installed in the mold component with insert removed.

4. The mold assembly according to claim 1 wherein the insert comprises molding surfaces defining a neck portion of the article to be molded and the neck portion comprises an opening and the molding surfaces of the insert comprise a dome component and a neck finish defining an exterior feature of the neck portion for engaging a closure for closing the opening of the neck portion and the insert comprises at least one knife insert, each knife insert forming a parting groove in the neck portion of the molded container between the dome and neck finish, the dome of each container being separated from the neck finish at the parting groove after molding of the article.

5. The mold assembly according to claim 4 wherein the at least one replaceable elements further comprise at least one heat pipe located with one end thereof proximate a knife insert and the other end thereof in the interior of a passage within the mating mold component for conducting a heat transfer fluid and wherein the heat pipes may be removed from or installed in the mold component with the insert removed.

6. The mold assembly according to claim 4 wherein the insert further comprises means for piercing the wall of the parison with mold closure, the piercing means comprising means for pressurizing the parison and being retained by retaining means accessible from the mating face side of the insert.

7. A blow molding machine comprising a press mechanism for operating a mold assembly, the mold assembly comprising first and second mating mold components, each mating mold component comprising molding surfaces open to a mating face of the mold component and defining the exterior of an article to be molded from a tubular parison, at least one replaceable insert comprising a portion of such molding surfaces being attached to the mating mold component by retaining means accessible from the mating face of the mating mold component, and at least one replaceable element comprising one of means for piercing a wall of the parison with mold closure, a heat pipe and a knife insert for forming a parting groove, each replaceable element being retained by retaining means accessible from the mating face of the mating mold component so that the replaceable element may be installed in and removed from the mating mold component while the mating mold component is mounted in a press of the blow molding machine.

8. The blow molding machine according to claim 7 wherein the means for piercing the wall of the parison with mold closure, comprises means for pressurizing the parison.

9. The mold assembly according to claim 7 wherein the at least one replaceable elements comprise at least one heat pipe located with one end thereof proximate a molding surface of the insert and the other end thereof in the interior of a passage within the mating meld component for conducting a heat transfer fluid and wherein the heat pipes may be removed from or installed in the mold component with insert removed.

10. The mold assembly according to claim 7 wherein the insert comprises molding surfaces defining a neck portion of the article to be molded and the neck portion comprises an opening and the molding surfaces of the insert comprise a dome component and a neck finish defining an exterior feature of the neck portion for engaging a closure for closing the opening of the neck portion and the insert comprises at least one knife insert, each knife insert forming a parting groove in the neck portion of the molded container between the dome and neck finish, the dome of each container being separated from the neck finish at the parting groove after molding of the article.

11. The mold assembly according to claim 10 wherein the at least one replaceable elements further comprise at least one heat pipe located with one end thereof proximate a knife insert and the other end thereof in the interior of a passage within the mating mold component for conducting a heat transfer fluid and wherein the heat pipes may be removed from or installed in the mold component with the insert removed.

12. The mold assembly according to claim 10 wherein the insert further comprises means for piercing the wall of the parison with mold closure, the piercing means comprising means for pressurizing the parison and being retained by retaining means accessible from the mating face side of the insert.

* * * * *